US012792494B2

(12) United States Patent
Zhang et al.

(10) Patent No.: US 12,792,494 B2
(45) Date of Patent: Nov. 10, 2026

(54) USER STATE SWITCHING METHOD, SYSTEM, DEVICE, MEDIUM AND COMPUTER PROGRAM PRODUCT

(71) Applicant: Shanghai Lilith Technology Corporation, Shanghai (CN)

(72) Inventors: Xing Zhang, Shanghai (CN); Xiaofeng Chen, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 286 days.

(21) Appl. No.: 18/728,635

(22) PCT Filed: Jan. 14, 2022

(86) PCT No.: PCT/CN2022/072025
§ 371 (c)(1),
(2) Date: Jul. 12, 2024

(87) PCT Pub. No.: WO2023/133802
PCT Pub. Date: Jul. 20, 2023

(65) Prior Publication Data

US 2025/0110856 A1 Apr. 3, 2025

(51) Int. Cl.
*G06F 11/362* (2025.01)

(52) U.S. Cl.
CPC ........ *G06F 11/366* (2013.01); *G06F 2201/81* (2013.01)

(58) Field of Classification Search
CPC .. G06F 11/366; G06F 2201/81; G06F 11/076; G06F 11/0793; A63F 13/42
See application file for complete search history.

(56) References Cited

U.S. PATENT DOCUMENTS

| | | | | |
|---|---|---|---|---|
| 2020/0242471 | A1 * | 7/2020 | Busch | G06V 10/764 |
| 2024/0272916 | A1 * | 8/2024 | Chiu | G06F 9/4498 |

* cited by examiner

*Primary Examiner* — Philip C Lee
(74) *Attorney, Agent, or Firm* — Taft Stettinius & Hollister LLP

(57) ABSTRACT

The present invention relates to the technical field of network service, and in particular, to a user state switching method, a system, a device, a medium and a computer program product. The user state switching method comprises: a receiving step: receiving a switching request for a user state; a query step: querying the user state; a determination step: determining, on the basis of a finite state machine of the user state, whether to allow switching of the user state; an error return step: if the switching of the user state is not allowed, returning error information; a state switching step: if the switching of the user state is allowed, modifying and storing information of the user state, and switching the user state on the basis of the finite state machine. Can meet complex user state switching design requirements, can perform self-repair of user state abnormalities, and can push the user's state to other users in real time.

12 Claims, 5 Drawing Sheets

USER STATE SWITCHING METHOD, SYSTEM, DEVICE, MEDIUM AND COMPUTER PROGRAM PRODUCT

CROSS-REFERENCE TO RELATED APPLICATIONS

This application is a U.S. National Phase of International PCT Application No. PCT/CN2022/072025, which was filed on Jan. 14, 2022, the contents of which are incorporated herein by reference in their entirety.

TECHNICAL FIELD

The present invention relates to the technical field of network service, and in particular, to a user state switching method, a system, a device, a medium and a computer program product.

BACKGROUND

As game servers gradually adopt distributed architecture, although the performance has been greatly improved, the game logic development has become complicated and data inconsistency problems are prone to occur. Especially in game development, the management and maintenance of player user state is particularly critical, which determines whether players can switch between various gameplay modes normally in the game. Taking shooting competitive games as an example, players can choose various gameplay modes after entering the game lobby, such as matchmaking battle gameplay, homeland gameplay, friend-to-friend sparring gameplay, etc. Different gameplay modes are supported and run by different servers.

Under the distributed server architecture, the gameplay switching solution is usually as follows: when a player wants to enter a certain gameplay, he sends a request to the server that supports this gameplay; the server that supports this gameplay then tries to modify the user state in the database according to preset rules. If the modification is successful, the player can enter this gameplay; if the modification fails, the player cannot enter this gameplay, but other players can query the player's current user state from the database.

However, the above-mentioned gameplay switching solution cannot realize complex state switching. For example, if a player wants to switch from gameplay A to gameplay B, the server must first execute the exit operation from gameplay A, and then apply to enter gameplay B. In addition, after the player character enters a certain gameplay, if the server supporting the gameplay crashes, the database will keep recording that the player is unable to exit the user state corresponding to the gameplay, causing the player to be unable to enter other gameplays. When other players want to know the user state of their friend players, they need to query the database. If timeliness is to be guaranteed, the query frequency must be increased, which will increase the pressure on the database.

SUMMARY

The purpose of the present invention is to provide a user state switching method, a system, a device, a medium and a computer program product that can meet complex user state switching design requirements, can perform self-repair of user state abnormalities, and can push the user's state to other users in real time.

The embodiment of the present application discloses a user state switching method, the method comprises:

a receiving step: receiving a switching request for a user state;

a query step: querying the user state;

a determination step: determining, on the basis of a finite state machine associated with the user state, whether to allow switching of the user state;

an error returning step: if the switching of the user state is not allowed, returning error information;

a state switching step: if the switching of the user state is allowed, modifying and storing information of the user state, and switching the user state on the basis of the finite state machine.

Optionally, determining whether to allow the switching of the user state comprises: allowing the user state to be switched from an idle state to a non-idle state or from the non-idle state to the idle state.

Optionally, the method further includes, when the user state is switched to a non-idle state, starting a health check mechanism; when the user state is switched to an idle state, closing the health check mechanism; the health check mechanism comprises:

checking the user state at predetermined intervals;

when it is determined that the number of times the user state has been abnormal reaches a predetermined threshold, repairing the abnormality.

Optionally, repairing the abnormality comprises:

reclaiming the server resources occupied by the user state;

modifying the information of the user state to an idle state;

when the abnormality is a code BUG, obtaining the BUG information; when the abnormality is a judgment logic problem, performing a timeout repair process.

Optionally, the predetermined interval is 10 seconds and the predetermined threshold is 3 times.

Optionally, wherein the method further comprises, if the switching of the user state is allowed, sending a notification message that the user state has switched.

Optionally, wherein, when the switching request is a request to switch from a first state of a non-idle state to a second state of a non-idle state, the state switching step comprises:

ending the application service of the first state, switching the user state from the first state to an idle state, and switching the user state from the idle state to the second state, and starting an application service of the second state.

The embodiment of the present application discloses a user state switching system, comprising a central service device, a state database device, and one or more state service devices; wherein, the state service device sends switching requests for user states to the central service device;

the central service device sends state query requests to the state database device;

the state database device returns the user state to the central service device;

the central service device determines, on the basis of a finite state machine associated with the user state, whether to allow switching of the user state, if not, returns an error message to the state service device, if so, updates the information of the user state and stores it in the state database device, and sends instructions to one or more of the state service devices based on the finite state machine to switch the user state.

Optionally, determining whether to allow the switching of the user state comprises: allowing the user state to be switched from an idle state to a non-idle state or from the non-idle state to the idle state.

Optionally, when the user state is switched to a non-idle state, the central service device starts a health check mechanism; when the user state is switched to an idle state, the central service device closes the health check mechanism; the health check mechanism comprises:

sending a state check request for the user state to the state service device at predetermined intervals;

receiving state health information of the user state from the state service device;

based on the state health information, when it is determined that the number of times the user state has been abnormal reaches a predetermined threshold, repairing the abnormality.

Optionally, repairing the abnormality comprises:

sending instructions to the state service device to reclaim the device resources occupied by the user state;

modifying the information of the user state to an idle state and storing it in the state database device;

when the abnormality is a code BUG, obtaining the BUG information from the state service device; when the abnormality is a judgment logic problem, sending instructions to the state service device to perform a timeout repair process.

Optionally, the predetermined interval is 10 seconds and the predetermined threshold is 3 times.

Optionally, the system further comprises a state subscription device; and if the central service device allows the switching of the user state, the central service device sends a notification message that the user state has switched to the state subscription device;

the state subscription device pushes the notification message that the user state has switched.

Optionally, when the switching request is a request to switch from a first state of a non-idle state to a second state of a non-idle state, sending instructions to one or more of the state service devices based on the finite state machine to switch the user state comprises:

sending an instruction for ending the application service of the first state to the state service device providing the application service of the first state, and sending an instruction for starting the application service of the second state to the state service device providing the application service of the second state.

An embodiment of this invention discloses an electronic device, the device including a processor and a memory storing computer-executable instructions which, when executed by the processor, cause the electronic device to implement any of the user state switching methods according to the embodiments of this invention.

An embodiment of this invention discloses a computer-readable storage medium having stored thereon computer-executable instructions which, when executed on a processor, cause the processor to perform any of the user state switching methods according to the embodiments of this invention.

An embodiment of this invention discloses a computer program product including computer-executable instructions executed by a processor to implement any of the user state switching methods according to the embodiments of this invention.

Compared with the prior art, the embodiments of this invention have the following main differences and effects:

In the present invention, based on the finite state machine associated with the user state, it is determined whether to allow the switching of the user state, which can meet the complex player state design requirements of game planners and allow players to experience a richer game experience.

In the present invention, health check mechanisms can perform self-repair of player state abnormalities, avoiding players getting stuck in the game and wasting resources.

In the present invention, if the switching of the user state is allowed, a notification message of the switching of the user state is sent, and the player's state can be notified to corresponding friends in real time. At the same time, other users do not need to frequently query the server, thereby reducing the pressure on the server.

DETAILED DESCRIPTION

Figure 1A:
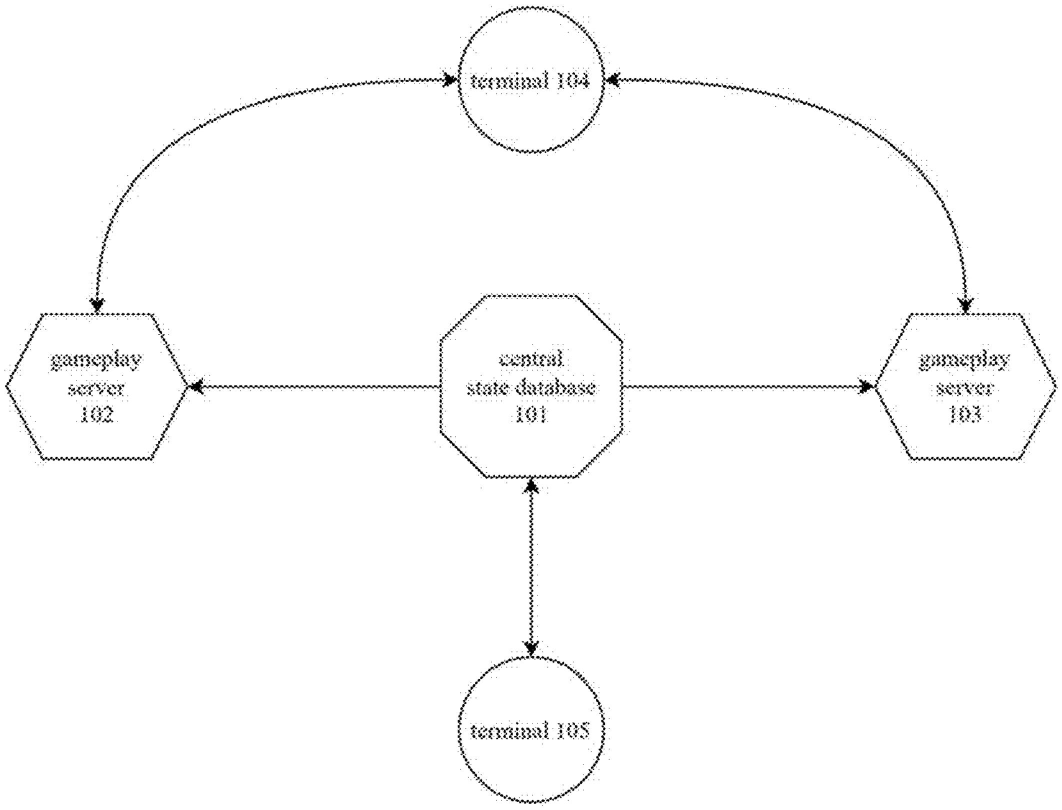
FIG. 1A is a schematic diagram showing a distributed server architecture for implementing user state switching in the prior art.

The present application is further described below with reference to specific embodiments and the drawings. It should be understood that the specific embodiments described herein are used merely to explain the present application, but are not intended to limit the present application. In addition, for ease of description, only some but not all structures or processes related to the present application are shown in the drawings. It should be noted that in this description, similar numerals and letters designate like items in the following drawings.

It should be understood that although the terms first, second, etc. may be used in the present disclosure to describe various features, these features should not be limited to these terms. These terms are used for distinction only and shall not be understood as an indication or implication of relative importance. For example, without departing from the scope of example embodiments, a first feature may be referred to as a second feature, and similarly a second feature may be referred to as a first feature.

In the description of the present application, it is also to be noted that, unless expressly stated and defined otherwise, the terms "arrangement", "connection", "link" are to be understood in a broad sense, for example, as a fixed connection, as a detachable connection, or as an integrated connection; may be a mechanical connection or an electrical connection; may be directly connected or indirectly connected by means of an intermediate medium, and may be internal communication of the two elements. The specific meaning of the above terms in this embodiment will be understood by one of ordinary skill in the art.

Illustrative embodiments of the present application include, but are not limited to a user state switching method, a system, a device, a medium and a computer program product.

Various aspects of the illustrative embodiments are described by using terms commonly used by persons skilled in the art to convey the substance of their work to others skilled in the art. However, it is apparent to the persons skilled in the art that some alternative embodiments may be practiced by using some of the described features. For purposes of explanation, specific numbers and configurations are set forth in order to provide a more thorough understanding of the illustrative embodiments. However, it is apparent to the persons skilled in the art that alternative embodiments may be practiced without the specific details. In other instances, well-known features have been omitted or simplified herein in order to avoid obscuring the illustrative embodiments of the application.

In addition, various operations will be described as a plurality of operations separated from each other in a manner most conducive to understanding the illustrative embodiments; however, the order of description should not be construed as to imply that these operations are necessarily dependent on the order of description, many of which operations may be performed in parallel, concurrently, or simultaneously. In addition, the order of operations can also be rearranged. When the described operations are completed, the processing may be terminated, but may further have additional steps not included in the figures. The processing may be corresponding to a method, a function, a procedure, a subroutine, a subprogram, or the like.

References in the specification to "an embodiment", "embodiment", "illustrative embodiment" and the like indicate that the described embodiments may include specific features, structures or properties, but each embodiment may or may not necessarily include specific features, structures or properties. Moreover, these phrases do not necessarily refer to the same embodiment. Furthermore, when certain features are described with reference to specific embodiments, the knowledge of the persons skilled in the art can affect the combination of these features with other embodiments, whether or not those embodiments are explicitly described.

Unless the context otherwise requires, the terms "comprising," "having," and "including" are synonyms. The phrase "A and/or B" indicates "(A), (B) or (A and B)".

As used herein, the term "module" may refer to, be a part of, or include: a memory (shared, dedicated, or group), an application-specific integrated circuit (ASIC), an electronic circuit, and/or a processor (shared, dedicated, or a group) that can execute one or more software or firmware programs, a combinatorial logic circuit, and/or other proper components that perform the said function.

In the drawings, some structural or methodological features may be shown in a particular arrangement and/or order. However, it should be understood that no such specific arrangement and/or ordering is required. Rather, in some embodiments, features may be described in a different manner and/or order than shown in the illustrative figures. In addition, the inclusion of structural or methodological features in a particular figure does not imply that all embodiments need to include such features, and in some embodiments, these features may not be included or may be combined with other features.

To make the objectives, technical solutions, and advantages of the present application clearer, the following further describes the embodiments of the present application in detail with reference to the accompanying drawings.

FIG. 1A is a schematic diagram showing a distributed server architecture for implementing user state switching in the prior art.

As shown in FIG. 1A, the distributed server architecture includes a central state database 101 based on Redis, and gameplay servers 102 and 103. Under the distributed server architecture, the user state (e.g., the state corresponding to the gameplay in the game) switching solution is: in the online game scenario, the player plays the online game through the terminal 104, and the online game includes a variety of gameplay services provided by the gameplay servers 102 and 103, that is, application services that provide users with specific gameplay methods. The user state of the player can be either indicating that he is in a certain gameplay or an idle state. When a player wants to switch from gameplay X provided by gameplay server 102 to gameplay Y provided by gameplay server 103, the player sends a gameplay entry request to gameplay server 103 through terminal 104, and gameplay server 103 tries to go to central state database 101 to modify the player's user state from gameplay X to gameplay Y Based on the preset state switching logic rules, if the modification is successful, the player enters gameplay server 103 and starts gameplay Y If the modification is unsuccessful, the player cannot enter gameplay server 103 and start gameplay Y However, this solution has the following disadvantages:

1) Complex user state switching cannot be achieved. The above-mentioned gameplay switching requirements can only be achieved through a simple state switching logic such as "when the user state is X, the user state can be switched to Y". When the state switching logic is: it can be achieved that when the state is idle, the state can be switched to gameplay Y; in this case, more complex requirements cannot be achieved, for example: state switching logic that allows switching to gameplay B when the player is in gameplay A and has been in play A for 1 hour cannot be achieved.
2) When the game server crashes and cannot support the game logout function, the central state database will keep recording that the player is still in the gameplay, making it impossible for the player to enter other gameplays, which has a very negative impact on the player.
3) For players who want to know the user state of their friends, they have to query the central state database every time. If timeliness is to be guaranteed, the query frequency must be increased, but this will greatly increase the pressure on the database.

Therefore, there is an urgent need for a user state switching solution that can meet complex user state switching design requirements, can self-repair user state abnormalities, and can push the user's state to other users in real time.

Figure 1B:
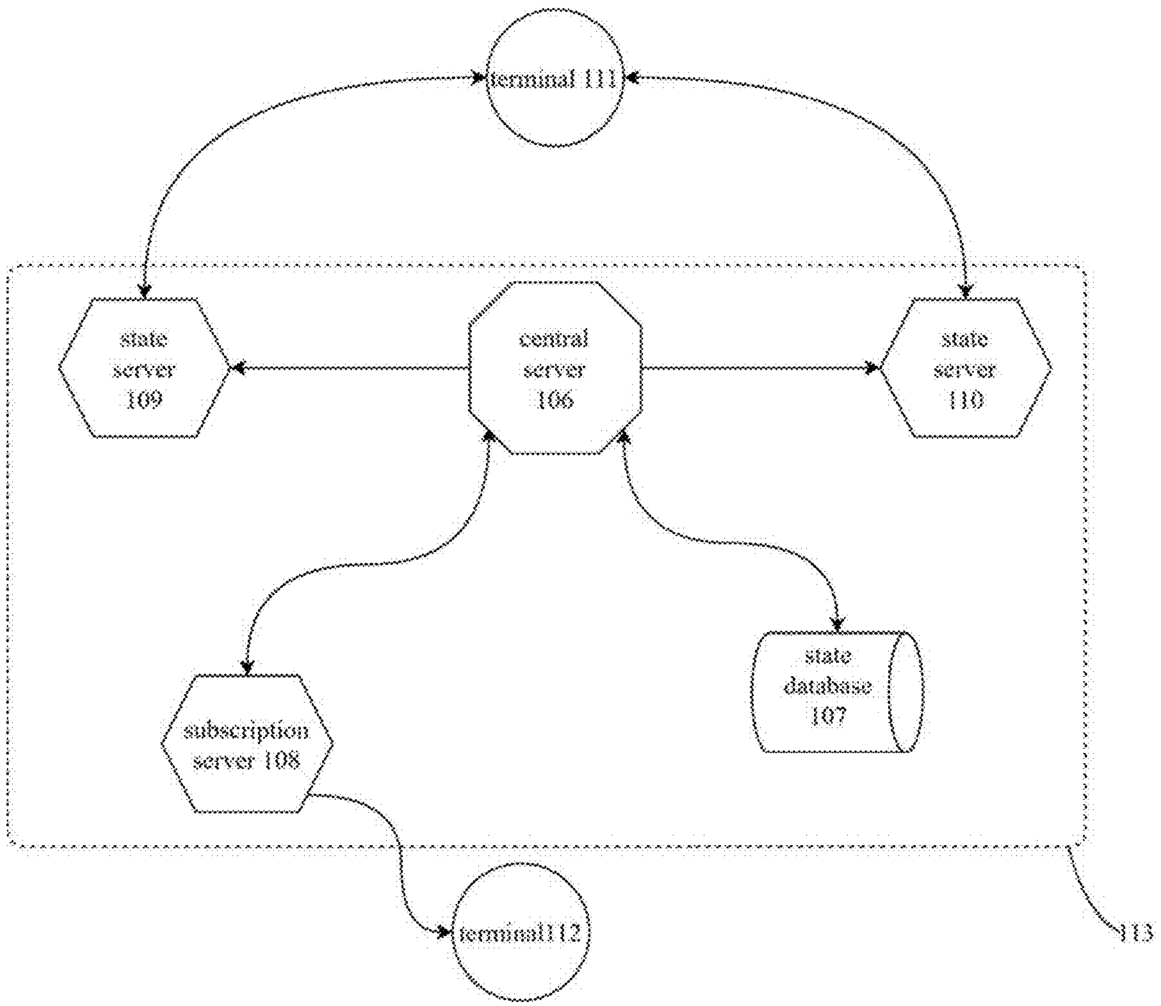
FIG. 1B shows a block diagram of a user state switching system according to an embodiment of the application.

FIG. 1B shows a block diagram of a user state switching system according to an embodiment of the application. The user state switching system 113 (also referred to as a server group 113) includes a central service device 106 (central server 106), a state database device 107 (state database 107), a subscription service device 108 (subscription server 108), and state service devices 109 and 110 (state servers 109 and 110). Wherein the terminal controlled by the player can communicate with each state server, each state server is connected to the central server 106, the central server 106 is connected to the subscription server 108 and the state database 107, and the subscription server 108 can also be connected to the terminal controlled by the player to push subscription messages. An implementation example of the user state switching system is described below in conjunction with FIG. 4:

In the online game scenario, the player plays the online game through the terminal 111. The online game includes a variety of gameplay services (for example, matching gameplay, battle gameplay, and homeland gameplay, all of which are application services that provide different ways of playing) provided by the gameplay servers (i.e., the state servers

109 and 110 in FIG. 1B). The user state of the player can be in any of the above-mentioned gameplays, and when the player is not in any of the gameplays, the user state at this time is called the idle state. When the player wants to switch from one user state to another user state (for example, from gameplay A to gameplay B, from gameplay A to idle state, or from idle state to gameplay A), the player sends a user state switching request to the corresponding state server through the terminal 111. For example, if the player wants to switch from gameplay B provided by the state server 109 to gameplay C provided by the state server 110, the player sends a gameplay entry request to the state server 110 through the terminal 111, and the state server 110 then sends a user state switching request to the central server 106.

Upon receiving the user state switching request from the terminal 111, the central server 106 queries the player state data characterizing the current user state of the player stored in the state database 107, which may include:

1) source server ID, indicating which server the current user state is generated on, which can be used to find the server when checking the state health and resetting the state, the source server is the state server 109 in this embodiment;
2) gameplay related information: such as gameplay type, gameplay map ID, etc., which can be used to display user state so that the player's friends can see what the player is playing;
3) state switching judgment parameters: such as the client version, which can be used to determine whether the state switching is allowed when the state switching is performed;
4) start time of the current user state: used to determine the duration of the current user state.

A finite state machine runs in the central server 106, and each player's account corresponds to a dedicated finite state machine, that is, the user state is associated with a finite state machine. The finite state machine defines the state switching logic, which only allows switching between specific gameplays. The state switching logic is defined by the game developer. For example, players are only allowed to switch from the idle state to gameplay A (for example, matching gameplay) and from gameplay A to gameplay B (for example, battle gameplay). Under the above definition, if a player wants to enter gameplay B from the idle state, he must first enter gameplay A. Alternatively, the state switching logic defined by the finite state machine allows the player's state to switch from the idle state to the non-idle state or from the non-idle state to the idle state, but does not allow the player to switch directly between gameplays. For example, the state switching logic stipulates that gameplay A (for example, matching gameplay) and gameplay C (for example, homeland gameplay) are mutually exclusive. If a player wants to enter gameplay C from gameplay A, he must first exit gameplay A and enter the idle state before entering gameplay C. Alternatively, the state switching logic of the finite state machine only allows players to enter other gameplays after accumulating a predetermined time in one gameplay; for example, if a player requests to enter gameplay A from gameplay C, the central server 106 determines whether the duration of the player in gameplay C reaches a predetermined threshold based on the start time of state C in the player state data of the player. If so, the player is allowed to enter gameplay A, otherwise the player is not allowed to enter gameplay A. Alternatively, the finite state machine only allows players using a predetermined version of the client to enter the predetermined gameplay; for example, gameplay C is a gameplay developed for the latest version of the client, and only players who play the game through the latest version of the client are allowed to enter. When the central server 106 receives a request to enter gameplay C from the player terminal 111, the central server 106 queries the client version in the state switching judgment parameter corresponding to the player in the state database 107 to determine whether the player is allowed to enter gameplay C.

Wherein, the switching of user state can be triggered by the player's request. For example, the matching state is triggered by the player clicking a "match" button displayed on the terminal 111 and sending a switching request via the terminal 111. The homeland state is triggered by the player clicking a "enter homeland" button displayed on the terminal 111 and sending a switching request via the terminal 111. The user state switching may also be driven by the server. For example, after the player successfully matches in the matching state, the central server 106 automatically causes the player to enter the battle state.

Specifically, if a player has been playing the game in gameplay A through terminal 111 and wants to switch to gameplay C, the player sends a request to switch the user state to gameplay C to the central server 106 through terminal 111. If the central server 106 does not allow the user state to be switched, it sends an instruction to the state server (i.e., state server 109) that sent the state switching request, so that the state server sends a message to terminal 111 to notify terminal 111 that the switching request fails.

If the central server 106 allows the switching of the user state, the central server 106 first updates the player's player state data and stores it in the state database 107, and then based on the state switching logic of the finite state machine, sends an instruction to the state server 109 to make the player exit the state server 109 corresponding to the previous gameplay (i.e., gameplay A), and sends an instruction to the state server 110 to make the state server 110 provide the requested gameplay C service for the player.

In the present invention, whether to allow the switching of the user state is determined based on the finite state machine corresponding to the user state, which can meet the complex player state design requirements of game planners and allow players to experience a richer game experience.

According to some embodiments of the present application, the central server 106 determines that when the user state is switched to a non-idle state, initiates a health check mechanism; the health check mechanism comprises: checking the user state at predetermined intervals; when it is determined that the number of times the user state has been abnormal reaches a predetermined threshold, repairing the abnormality.

Specifically, the health check mechanism comprises:

Taking the example of a player controlling a game character to enter gameplay C supported by the state server 110, the central server 106 sends a state check request to the state server 110 at predetermined intervals, including checking whether the state server 110 crashes, whether a bug (i.e., a program error) occurs in the gameplay C code when the player plays gameplay C, etc. The predetermined interval may be 10 seconds. The state server 110 then returns the check result to the central server 106, and the central server 106 determines whether the user state is abnormal based on the check result. If the user state is abnormal and the number of abnormalities reaches a predetermined threshold (for example, the predetermined threshold may be 3 times), the central server 106 sends an instruction to the state server 110 to enable the state server 110 to repair the abnormality; for example, the state server 110 reclaims the server resources occupied by the player in gameplay C (meaning that the player exits the state server 110 and enters an idle state) to avoid waste of resources, and the central server 106 modifies the player state data of the player in the state database 107 to an idle state. When the abnormality is a code BUG, the central server 106 obtains the BUG information from the state server 110 and outputs the BUG information to the operation and maintenance personnel; when the abnormality is a judgment logic problem, the central server 106 cooperates with the state server 110 to perform a timeout repair process, such as resetting the user's state to idle.

When the user state is switched to the idle state, the central server 106 closes the health check mechanism. In this way, the resources of the central server 106 can be invested in the players who are playing the game, and the resources are reasonably utilized.

In the present invention, the health check mechanism can perform self-repair of player state abnormalities, avoiding players getting stuck in the game and wasting resources.

According to some embodiments of the application, if the central server 106 allows the switching of the user state, it sends a notification message of the switching of the user state to the subscription server 108. For example, the player P1 switches the state (for example, enters the gameplay A from the idle state), the central server 106 generates a corresponding event message, and then sends the event message to the subscription server 108, and then the subscription server 108 sends a notification message to the terminal 112 of the player P2 who has subscribed to the details of the player P1, notifying that the state of the player P1 has switched.

In the present invention, the player's state can be notified to corresponding friends in real time through the above-mentioned message subscription mechanism, and other users do not need to frequently query the server, thereby reducing the pressure on the server.

According to some embodiments of the present application, when the switching request is a request to switch from a first state of a non-idle state to a second state of a non-idle state, sending instructions to one or more of the state service devices based on the finite state machine to switch the user state. Specifically, when the player is playing gameplay A (i.e., the first state) provided by the state server 109 and wants to switch to gameplay C (i.e., the second state) provided by the state server 110, the terminal 111 controlled by the player sends a user state switching request to the state server 109, and the state server 109 forwards the switching request to the central server 106; the central server 106 sends an instruction to the state server 109 based on the finite state machine corresponding to the user account, so that the state server 109 ends the application service for the user, that is, ends the gameplay A service; then the central server 106 sends an instruction to the state server 110, so that the state server 110 provides the application service of gameplay C to the player.

In another embodiment of the present application, as shown in FIG. 1B, a user state switching method can be implemented by a separate electronic device 113 (server 113) to realize the functions of the central service device 106 (central server 106), the state database device 107 (state database 107), the subscription service device 108 (subscription server 108), and the state service devices 109 and 110 (state servers 109 and 110). The server 113 can be divided into a central service module, multiple state service modules, a subscription service module, and a state database to realize the minimum architecture supporting user state switching.

Figure 2:
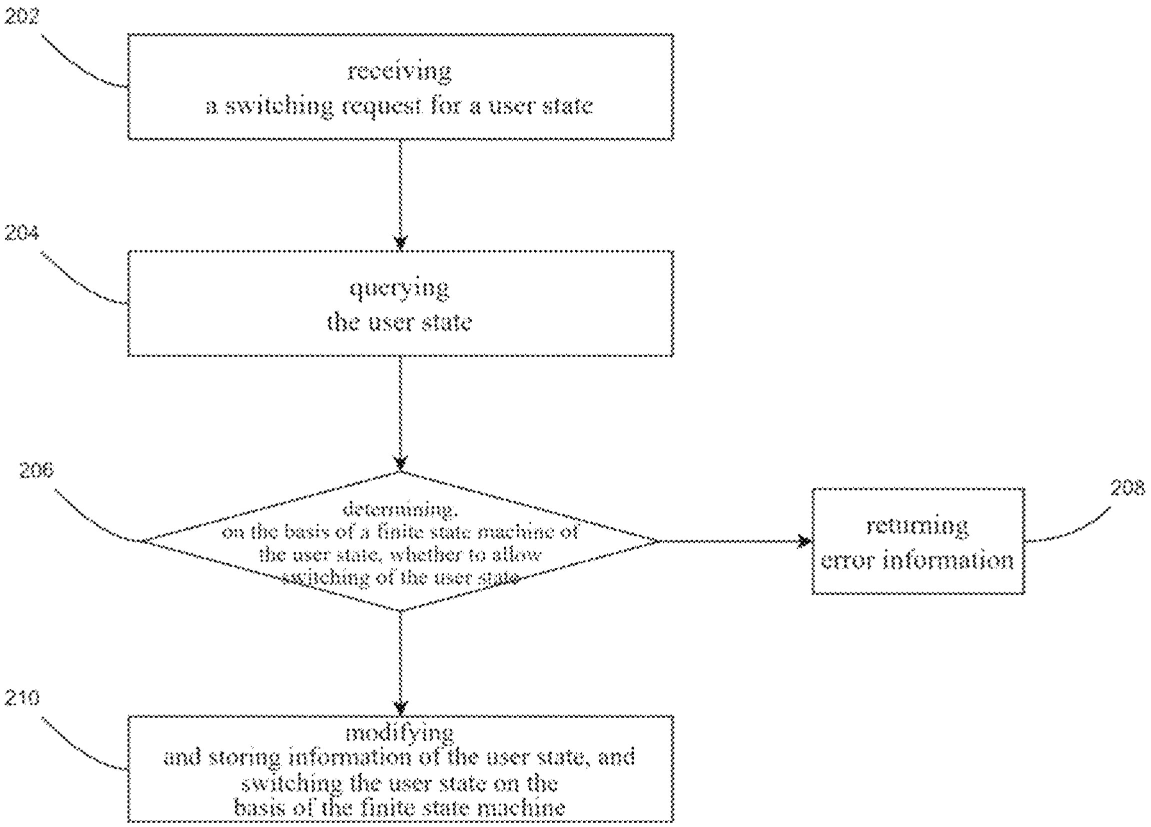
FIG. 2 shows a flow chart of a user state switching method according to an embodiment of the application.

FIG. 2 shows a flow chart of a user state switching method according to an embodiment of the application, and the user state switching method can be used in the user state switching system in the above-mentioned embodiment. An example of the user state switching method is described below in conjunction with FIG. 1B and FIG. 2, and the method includes:

a receiving step 202: receiving a switching request for a user state; for example, in an online game scenario, a player plays an online game provided by a server group 113 (or user state switching system 113) through a terminal 111, and the server group 113 provides a variety of gameplay services for the player (for example, matching gameplay, battle gameplay, homeland gameplay, all of which are application services that provide different ways of playing). The user state of the player can be in any of the above-mentioned gameplays, and when the player is not in any of the gameplays, the user state at this time is called the idle state. When the player wants to switch from one state to another (for example, from gameplay A to gameplay B, from gameplay A to idle state, or from idle state to gameplay A), the player sends a user state switching request to the server group 113 through the terminal 111.

a query step 204: querying the user state; for example, upon receiving the user state switching request from the terminal 111, the server group 113 queries the player state data characterizing the current user state of the player stored in the state database 107 of the server group 113, the player state data may include:

1) source server ID, indicating which server the state is generated on, which can be used to find the server when checking the state health and resetting the state;
2) gameplay related information: such as gameplay type, gameplay map ID, etc., which can be used to display user state so that the player's friends can see what the player is playing;
3) state switching judgment parameters: such as the client version, which can be used to determine whether the state switching is allowed when the state switching is performed;
4) start time of the current user state: used to determine the duration of the state.

A determination step 206: determining, on the basis of a finite state machine associated with the user state, whether to allow switching of the user state. Each player's account corresponds to a dedicated finite state machine, that is, the user state is associated with a finite state machine. For example, a finite state machine is running in the server group 113, and the finite state machine only allows switching between specific gameplays. The state switching logic is defined by the game developer. For example, players are only allowed to switch from the idle state to gameplay A (for example, matching gameplay) and from gameplay A to gameplay B (for example, battle gameplay), that is, if a player wants to enter gameplay B from the idle state, he must first enter gameplay A. Alternatively, the finite state machine allows the player's state to switch from the idle state to the non-idle state or from the non-idle state to the idle state, but does not allow the player to switch directly between gameplays. For example, gameplay A (for example, matching gameplay) and gameplay C (for example, homeland gameplay) are mutually exclusive. If the player wants to enter gameplay C from gameplay A, he must first exit gameplay A and enter the idle state before entering gameplay C. Alternatively the finite state machine only allows players to enter other gameplays after accumulating a predetermined time in one gameplay; for example, if a player requests to enter gameplay A from gameplay C, the server group 113 determines whether the duration of the player in gameplay C reaches a predetermined threshold based on the start time of state C in the player state data of the player. If so, the player is allowed to enter gameplay A, otherwise the player is not allowed to enter gameplay A. Alternatively, the finite state machine only allows players using a predetermined version of the client to enter the predetermined gameplay; for example, gameplay C is a gameplay developed for the latest version of the client, and only players who play the game through the latest version of the client are allowed to enter. When the server group 113 receives a request to enter gameplay C from the player terminal 111, the server group 113 queries the client version in the state switching judgment parameter corresponding to the player to determine whether the player is allowed to enter gameplay C.

Wherein, the switching of state can be triggered by the player's request. For example, the matching state is triggered by the player clicking a "match" button displayed on the terminal 111 and sending a switching request via the terminal 111. The homeland state is triggered by the player clicking a "enter homeland" button displayed on the terminal 111 and sending a switching request via the terminal 111. The user state switching may also be driven by the server. For example, after the player successfully matches in the matching state, the server group 113 automatically causes the player to enter the battle state.

If the user state switching is not allowed, then in the error returning step 208, returning error information; for example, the server group 113 sends a message to the terminal 111 to inform the terminal 111 that the switching request fails.

If the user state switching is allowed, then in a state switching step 210, modifying and storing information of the user state, and switching the user state on the basis of the finite state machine. For example, the server group 113 first updates and stores the player state data of the player, and then based on the logic of the finite state machine, removes the player from the gameplay he was in and provides the requested gameplay service for the player.

In the present invention, whether to allow the switching of the user state is determined based on the finite state machine corresponding to the user state, which can meet the complex player state design requirements of game planners and allow players to experience a richer game experience.

According to some embodiments of the present application, the method further includes, when the user state is switched to a non-idle state, starting a health check mechanism; the health check mechanism comprises: checking the user state at predetermined intervals; when it is determined that the number of times the user state has been abnormal reaches a predetermined threshold, repairing the abnormality.

Figure 3:
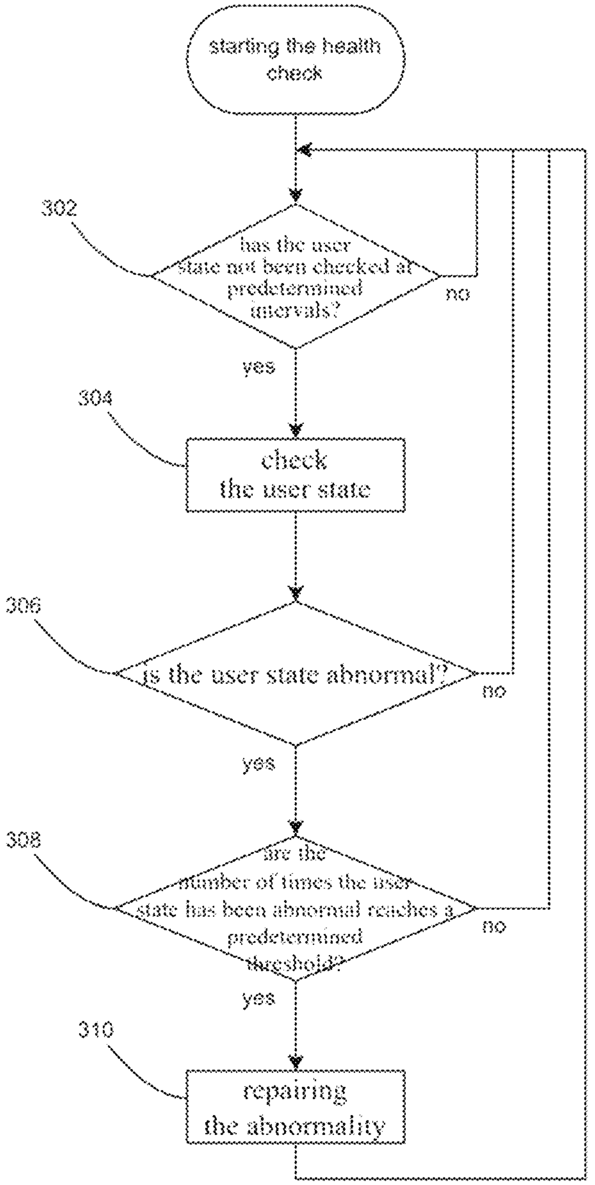
FIG. 3 shows a flow chart of a health check mechanism according to an embodiment of the application.

FIG. 3 shows a flow chart of a health check mechanism according to an embodiment of the application, the health check mechanism comprises as shown in FIG. 3:

step 302, determine whether the user state has not been checked at predetermined intervals; for example, the predetermined interval may be 10 seconds.

If the judgment result of step 302 is no, repeating step 302.

If the judgment result of step 302 is yes, go to step 304 to check the user state; for example, when the player requests to enter gameplay B and the server group 113 allows the player to enter gameplay B, after the server group 113 starts the health check mechanism, the player enters gameplay B, and the player's state is checked at predetermined intervals, including checking whether the state server providing gameplay B crashes, whether a bug occurs in the gameplay B code when the player is playing gameplay B, etc.

Step 306, determine whether the user state is abnormal.

If the judgment result of step 306 is no, repeating step 302.

If the judgment result of step 306 is yes, in step 308, determining whether the number of times the user state has been abnormal reaches a predetermined threshold; for example, the predetermined threshold may be 3 times.

If the judgment result of step 308 is no, repeating step 302.

If the judgment result of step 308 is yes, in step 310, repairing the abnormality; for example, the server group 113 reclaims the server resources occupied by the player in gameplay B to avoid waste of resources, and modifies the player state data of the player to an idle state. If the abnormality is a code bug, the server group 113 obtains the BUG information and outputs the BUG information; if the abnormality is a judgment logic problem, the server group 113 performs a timeout repair process.

Returning to step 302 after step 310.

In the present invention, self-repairs of player state abnormalities can be performed, avoiding players getting stuck in the game and wasting resources.

According to some embodiments of the present application, the health check mechanism further includes: when the user state is switched to an idle state, closing the health check mechanism.

According to some embodiments of the present application, the user state switching method further includes, if the switching of the user state is allowed, sending a notification message of the switching of the user state to other terminals. For example, when the player P1 switches the state (for example, enters the gameplay A from the idle state), the server group 113 generates a corresponding event message, and then sends the event message to the terminal 112 of the player P2 who has subscribed to the state of the player P1 or other terminals of multiple players (not shown in the drawings).

In the present invention, the player's state can be notified to corresponding friends in real time, and other users do not need to frequently query the server, thereby reducing the pressure on the server.

It is understandable that the state switching, the start of the health check mechanism, and the sending of the notification message of the user state switching can be performed in any order. For example, after allowing the user state switching, starting the health check mechanism, and then sending the notification message of the user state switching, and then the user state is actually switched; or after allowing the user state switching, sending the notification message of the user state switching, and then starting the health check mechanism, and then the user state is actually switched; or after the user state is actually switched, starting the health check mechanism, and then sending the notification message of the user state switching; or after the user state is actually switched, sending the notification message of the user state switching, and then starting the health check mechanism; or after allowing the user state switching, starting the health check mechanism, and then the user state is actually switched, and then sending the notification message of the user state switching; or after allowing the user state switching, sending the notification message of the user state switching, and then the user state is actually switched, and then starting the health check mechanism;

According to some embodiments of the present application, wherein, when the switching request is a request to switch from a first state of a non-idle state to a second state of a non-idle state, the state switching step 210 comprises:

ending the application service of the first state, switching the user state from the first state to an idle state, and switching the user state from the idle state to the second state, and starting an application service of the second state.

Figure 4:
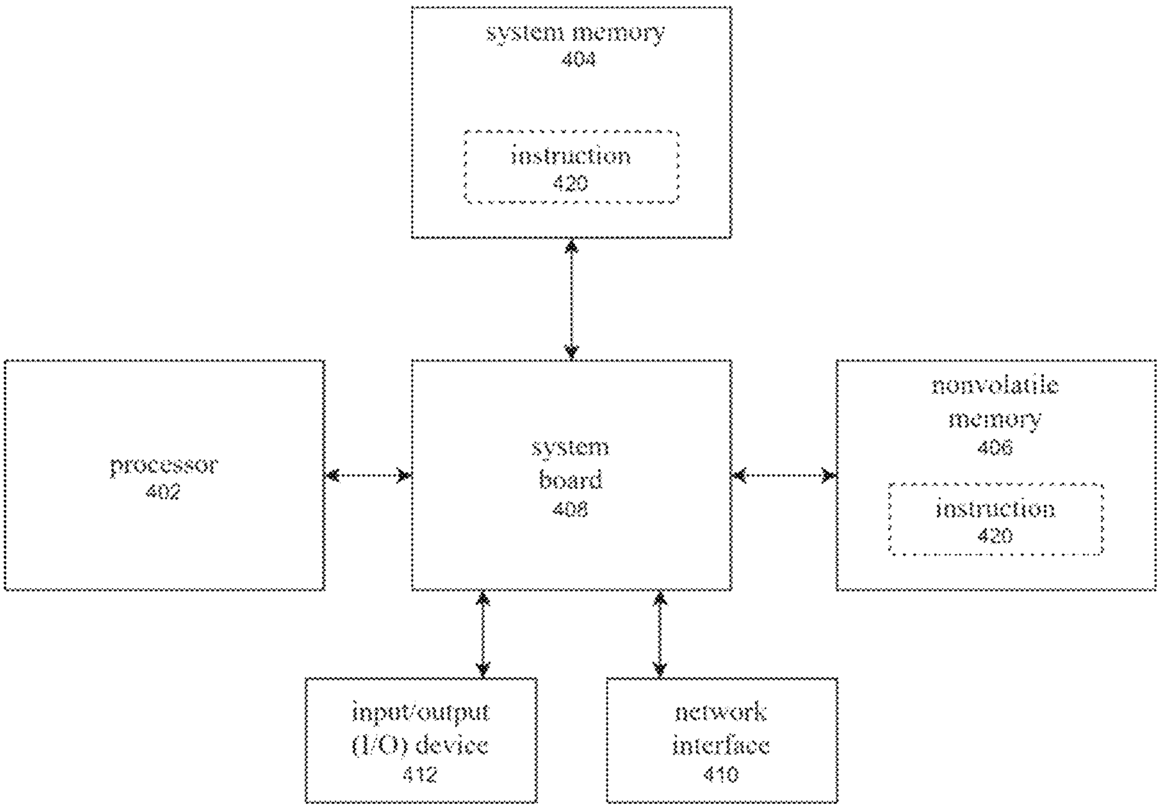
FIG. 4 shows a hardware structure block diagram of an electronic device implementing a user state switching method according to an embodiment of the application.

FIG. 4 shows a hardware structure block diagram of an electronic device implementing a user state switching method according to an embodiment of the invention.

As shown in FIG. 4, the electronic device 400 may be any one of the central service device 106 (central server 106), the state database device 107 (state database 107), the subscription service device 108 (subscription server 108), the state service devices 109 and 110 (state servers 109 and 110) and the electronic device 113 (server 113), or may be a single server device having the above functional modules. The electronic device 400 may include one or more processors 402, a system board 408 connected to at least one of the processors 402, a system memory 404 connected to the system board 408, a nonvolatile memory (NVM) 406 connected to the system board 408, and a network interface 410 connected to the system board 408.

The processor 402 may include one or more single-core or multi-core processors. The processor 402 may include any combination of a general-purpose processor and a special-purpose processor (such as, a graphics processing unit, an application processor, or a baseband processor). In an embodiment of this invention, the processor 402 may be configured to perform one or more embodiments according to various embodiments shown in FIGS. 2-3.

In some embodiments, the system board 408 may include any suitable interface controller, to provide any suitable interface for at least one of the processors 402 and/or any suitable device or component communicating with the system board 408.

In some embodiments, the system board 408 may include one or more memory controllers to provide an interface connected to the system memory 404. The system memory 404 may be used to load and store data and/or an instruction. In some embodiments, the system memory 404 of the electronic device 400 may include any suitable volatile memory, such as a suitable dynamic random access memory (DRAM).

NVM 406 may include one or more tangible and non-transitory computer-readable media for storing data and/or the instruction. In some embodiments, NVM 406 may include any suitable nonvolatile memory such as a flash memory and/or any suitable nonvolatile storage device, such as a HDD (Hard Disk Drive, hard disk drive), a CD (Compact Disc, Compact Disc) drive, a DVD (Digital Versatile Disc, Digital Versatile Disc) drive.

NVM 406 may include a portion of storage resources installed on the apparatus of the electronic device 400, or may be accessed by a device, but is not necessarily part of a device. For example, NVM 406 may be accessed over a network via the network interface 410.

In particular, the system memory 404 and the NVM 406 may respectively include: a temporary copy and a permanent copy of the instruction 420. The instruction 420 may include: an instruction that causes the electronic device 400 to implement the method shown in FIG. 2-3 when executed by at least one of the processors 402. In some embodiments, the instruction 420, hardware, firmware, and/or software components thereof may additionally/alternatively reside in the system board 408, the network interface 410, and/or the processor 402.

The network interface 410 may include a transceiver for providing a radio interface for the electronic device 400 to communicate with any other suitable devices (such as, a front-end module and an antenna) by using one or more networks. In some embodiments, the network interface 410 may be integrated with other components of the electronic device 400. For example, the network interface 410 may be integrated into at least one of the processors 402, the system memory 404, the NVM 406, and a firmware device (not shown) having an instruction, and when at least one of the processors 402 executes the instruction, the electronic device 400 implements one or more of the various embodiments shown in FIG. 2-3.

The network interface 410 may further include any suitable hardware and/or firmware to provide a multiple-input multiple-output wireless interface. For example, the network interface 410 may be a network adapter, a wireless network adapter, a telephone modem, and/or a wireless modem.

In one embodiment, at least one of the processors 402 may be packaged with one or more controllers used for the system board 408 to form a system in a package (SiP). In one embodiment, at least one of the processors 402 may be integrated on the same die with one or more controllers used for the system board 408 to form a system on a chip (SoC).

The electronic device 400 may further include: an input/output (I/O) device 412 connected to the system board 408. The I/O device 412 may include a user interface, so that a user can interact with the electronic device 400; peripheral components can also interact with the electronic device 400 by using a design of a peripheral component interface. In some embodiments, the electronic device 400 further includes a sensor for determining at least one of environmental conditions and location information related to the electronic device 400.

In some embodiments, the I/O device 412 may include, but is not limited to, a display (such as, a liquid crystal display and a touch screen display), a speaker, a microphone, one or more cameras (such as, a still image camera and/or a video camera), a flashlight (such as, a LED flash), and a keyboard.

In some embodiments, the peripheral component interface may include, but is not limited to, a nonvolatile memory port, an audio jack, and a power interface.

In some embodiments, sensors may include, but are not limited to, gyroscope sensors, accelerometers, proximity sensors, ambient light sensors, and positioning units. The positioning unit may also be part of or interact with the network interface 410 to communicate with components of the positioning network, such as Global Positioning System (GPS) satellites.

It can be understood that, the structure illustrated in the embodiment of the present invention does not constitute a specific limitation on the electronic device 400. In other embodiments of the present application, the electronic device 400 may include more or fewer components than those shown in the figure, or combine some components, or split some components, or have different component arrangements. The illustrated components may be implemented in hardware, software, or a combination of software and hardware.

Program code can be applied to input instructions to perform the functions described in the present invention and to generate output information. The output information may be applied to one or more output devices in a known manner.

For purposes of the present application, a system used for processing the instructions and including the processor 402 includes any system with a processor such as a digital signal processor (DSP), a microcontroller, an application specific integrated circuit (ASIC), or a microprocessor.

The program code can be implemented in a high-level programming language or an object-oriented programming language to communicate with a processing system. The program code can also be implemented in an assembly language or a machine language, if desired. In fact, the mechanism described in the present invention is not limited in scope to any particular programming language. In either case, the language may be an assembly language or an interpreted language.

One or more aspects of at least one embodiment may be implemented by instructions stored on a computer-readable storage medium that, when read and executed by a processor, enable an electronic device to implement the methods of the embodiments described in this invention.

According to some embodiments of the present application, disclose a computer storage medium having stored thereon instructions which, when run on a computer, cause the computer to perform any of the possible methods of the first embodiment described above.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

According to some embodiments of the application, a computer program product is disclosed, including computer-executable instructions executed by a processor to implement a user state switching method according to an embodiment of the invention.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

In some cases, the disclosed embodiments may be implemented in hardware, firmware, software, or any combination thereof. The disclosed embodiments may also be implemented in the form of instructions or programs carried or stored on one or more transient or non-transient machine-readable (e.g., computer-readable) storage media, which may be read and executed by one or more processors or the like. When instructions or programs are run by a machine, the machine may perform the various methods described above. For example, the instructions may be distributed over a network or other computer-readable medium. Thus, a machine-readable medium may include, but is not limited to, any mechanism for storing or transmitting information in a form readable by a machine (e.g., a computer), such as a floppy disk, an optical disk, an optical disk read-only memory (CD-ROMs), a magneto-optical disk, a read-only memory (ROM), a random access memory (RAM), an erasable programmable read-only memory (EPROM), an electronically erasable programmable read-only memory (EEPROM), a magnetic or optical card, or a flash or tangible machine-readable memory for transmitting network information through electrical, optical, acoustic, or other forms of signals (e.g., a carrier wave, an infrared signal, a digital signal, etc.). Thus, a machine-readable medium includes any form of machine-readable medium suitable for storing or transmitting electronic instructions or machine (e.g., computer) readable information.

The embodiments of the present application have been described in detail above in connection with the drawings, but the use of the technical solutions of the present application is not limited to the various applications mentioned in the examples of the present patent, and various structures and variations can be readily implemented with reference to the technical solutions of the present application to achieve the various advantages mentioned herein. Various changes made without departing from the purpose of the present application shall fall within the scope of the patent of the present application, within the knowledge of one of ordinary skill in the art.

The invention claimed is:

1. A user state switching method, the method comprises:

a receiving step: receiving a switching request for a user state;

a query step: querying the user state;

a determination step: determining, on the basis of a finite state machine associated with the user state, whether to allow switching of the user state;

an error returning step: if the switching of the user state is not allowed, returning error information;

a state switching step: if the switching of the user state is allowed, modifying and storing information of the user state, and switching the user state on the basis of the finite state machine;

wherein the method further comprises, when the user state is switched to a non-idle state, starting a health check mechanism; and when the user state is switched to an idle state, closing the health check mechanism; and wherein the health check mechanism comprises: checking the user state at predetermined intervals; and when the number of times the user state has been determined to be abnormal reaches a predetermined threshold, repairing the abnormality.

2. The method accordingto claim 1, wherein determining whether to allow the switching of the user state comprises: allowing the user state to be switched from the idle state to the non-idle state or from the non-idle state to the idle state.

3. The method according to claim 1, wherein repairing the abnormality comprises:

reclaiming the server resources occupied by the user state; modifying the information of the user state to the idle state;

when the abnormality is a code BUG, obtaining the BUG information; when the abnormality is a judgment logic problem, performing a timeout repair process.

4. The method according to claim 1, wherein the method further comprises, if the switching of the user state is allowed, sending a notification message that the user state has switched.

5. The method according to claim 1, wherein, when the switching request is a request to switch from a first state of the non-idle state to a second state of the non-idle state, the state switching step comprises:

ending the application service of the first state, switching the user state from the first state to the idle state, and switching the user state from the idle state to the second state, and starting an application service of the second state.

6. Auser state switching system, comprising a central service device, a state database device, and one or more state service devices; wherein, the state service device sends switching requests for user states to the central service device;

the central service device sends state query requests to the state database device;

the state database device returns the user state to the central service device;

the central service device determines, on the basis of a finite state machine associated with the user state, whether to allow switching of the user state, if not, returns error information to the state service device, if so, updates the information of the user state and stores the information of the user state in the state database device, and sends instructions to one or more of the state service devices based on the finite state machine to switch the user state;

wherein, when the user state is switched to a non-idle state, the central service device starts a health check mechanism; and when the user state is switched to an idle state, the central service device closes the health check mechanism; and wherein the health check mechanism comprises sending a state check request for the user state to the state service device at predetermined intervals; receiving state health information of the user state from the state service device; and based on the state health information, when the number of times the user state has been determined to be abnormal reaches a predetermined threshold, repairing the abnormality.

7. The system according to claim 6, wherein determining whether to allow the switching of the user state comprises: allowing the user state to be switched from the idle state to the non-idle state or from the non-idle state to the idle state.

8. The system according to claim 6, wherein repairing the abnormality comprises:

sending instructions to the state service device to reclaim the device resources occupied by the user state;

modifying the information of the user state to the idle state and storing the information of the user state in the state database device;

when the abnormality is a code BUG, obtaining the BUG information from the state service device; when the abnormality is a judgmentlogic problem, sendingin-structions to the state service device to perform a timeout repair process.

9. The system of claim 6, wherein the system further comprises a state subscription device:

if the central service device allows the switching of the user state, the central service device sends a notification message that the user state has switched to the state subscription device;

the state subscription device pushes the notification message that the user state has switched.

10. The system according to claim 6, wherein, when the switching request is a request to switch from a first state of the non-idle state to a second state of the non-idle state, sending instructions to one or more of the state service devices based on the finite state machine to switch the user state comprises:

sending an instruction for ending the application service of the first state to the state service device providing the application service of the first state, and sending an instruction for starting the application service of the second state to the state service device providing the application service of the second state.

11. An electronic device, the device including a processor and a memory storing computer-executable instructions which, when executed by the processor, cause the electronic device to implement the user state switching method according to claim 1.

12. A computer-readable storage medium having stored thereon computer-executable instructions which, when executed on a processor, cause the processor to perform the user state switching method according to claim 1.

* * * * *